Figure 1:
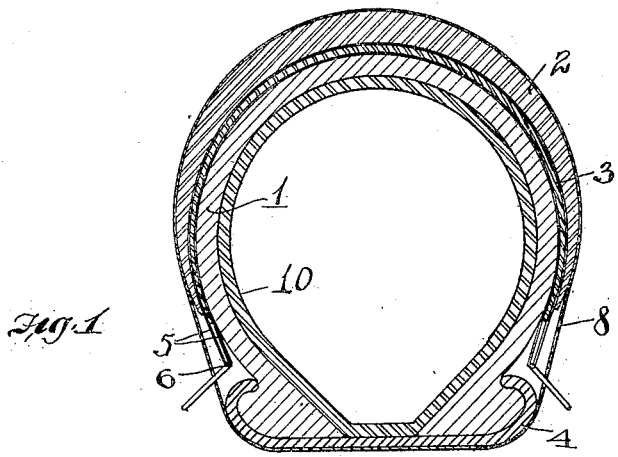

W. B. BURKE.
APPARATUS FOR VULCANIZING RUBBER.
APPLICATION FILED JAN. 10, 1917.

1,375,360.

Patented Apr. 19, 1921.

INVENTOR
Wilbur B. Burke.
BY
ATTORNEYS

UNITED STATES PATENT OFFICE.

WILBUR B. BURKE, OF CLEVELAND, OHIO, ASSIGNOR TO THE ELECTRIC VULCANIZING RUBBER COMPANY, OF AKRON, OHIO, A CORPORATION OF OHIO.

APPARATUS FOR VULCANIZING RUBBER.

1,375,360.     Specification of Letters Patent.     Patented Apr. 19, 1921.

Original application filed February 16, 1916, Serial No. 78,572. Divided and this application filed January 10, 1917. Serial No. 141,570.

*To all whom it may concern:*

Be it known that I, WILBUR B. BURKE, a citizen of the United States, and a resident of Cleveland, county of Cuyahoga, and State of Ohio, have invented a new and useful Improvement in Apparatus for Vulcanizing Rubber, of which the following is a specification, the principle of the invention being herein explained and the best mode in which I have contemplated applying that principle so as to distinguish it from other inventions.

In the present commercial method of vulcanizing rubber, as is well known, the necessary temperature is generally produced by subjecting the article to the influence of steam. In other words, the heat is first applied to the exterior of the article, gradually permeating its inner parts. This is equally true in minor vulcanizing operations, as in repair jobs on tires, where the heat is produced by burning gasolene or some other combustible on a metal plate applied to the article to be vulcanized; in other words, heat obviously is externally applied to such article.

The difficulty in securing a uniform degree of vulcanization or of hardness, especially in articles of appreciable thickness, such as tire casings and the like, has long been realized, and perhaps in no connection more acutely than in the operation of retreading worn tire casings. In such retreading operation, as need only be briefly explained, a fresh tread requires to be vulcanized onto the old casing, a thin layer of gum rubber being interposed between the two, and the whole then subjected to pressure and heat so as to unite the new tread with such old casing. In this operation, however, not only is it difficult to uniformly vulcanize all portions of the interposed layer of fresh gum but in vulcanizing such layer the old casing and newly applied tread must obviously be overcured so as to materially affect the wearing quality of both.

The object of the present invention, accordingly, is to provide an improved method and means for use therein, whereby, under circumstances such as just explained, a uniform degree of vulcanization may be secured throughout the article being treated, and whereby, furthermore, such vulcanization can be localized, as in the retreading operation described, so as not to affect deleteriously the parts which do not require to be vulcanized. It is not intended of course to imply any limitation in the application of the invention to this particular use, although specific reference will be made thereto by way of illustration in the following description as well as in the claims.

It should also be explained that the method aspect of the invention forms the subject matter of a separate application filed February 16, 1916, Serial No. 78,572, since issued into Patent No. 1,216,654, dated February 20, 1917, out of which it has been required that the present case be divided.

The annexed drawing and the following description set forth in detail certain mechanism embodying the invention, such disclosed means constituting, however, but one of various mechanical forms in which the principle of the invention may be used.

In said annexed drawing:—

Figure 2:
Figure 3:
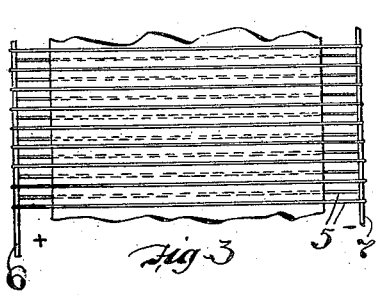
Figure 4:
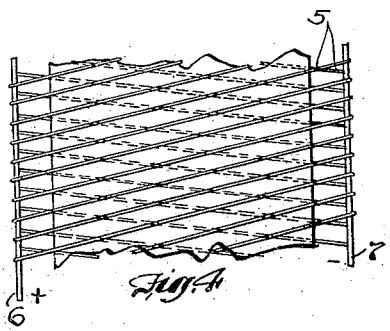
Figure 5:
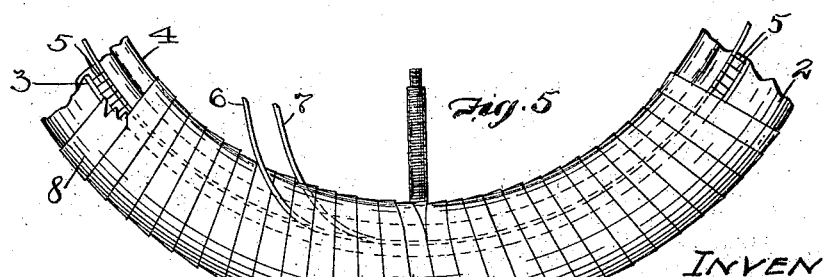

Figure 1 is a cross-sectional view of a worn tire casing arranged for the application of a new tread thereto in accordance with my present improved method and apparatus; Fig. 2 is a cross-sectional view on an enlarged scale of the intermediate layer of fresh rubber interposed between such worn casing and the new tread; Fig. 3 is a plan view of a section of such sheet of rubber showing the disposition of certain electric resistance heating elements with relation thereto; Fig. 4 is a view similar to Fig. 3, but showing a modification in the arrangement of such heating elements; and Fig. 5 is a side elevational view of the complete casing as prepared for the vulcanizing operation.

Referring to Fig. 1, the tire casing 1 with the new tread 2 and interposed layer 3 of fresh rubber are there shown properly arranged for the vulcanization of such layer of fresh rubber. To this end the old tire casing 1 is mounted on a rim 4, preferably a demountable rim of the sort ordinarily used on automobiles of the present day, in order to avoid the necessity of handling the wheel which would constitute merely an incumbrance. The inner tube 10 is disposed in place within the casing or shoe ready to be inflated as hereinafter described. Before placing the new tread upon such casing, a layer of fresh i. e. un-vulcanized rubber is applied about the entire circumference of the old casing in the usual fashion, the sheet of rubber used for this purpose being of a sufficient width to extend transversely of the casing approximately from the bead on the one side thereof to that on the other.

It is to the special means provided for heating this layer of fresh rubber that attention is directed, such means consisting of suitable electric resistance elements so disposed and arranged that this layer may be directly and uniformly heated throughout practically its entire extent, and the vulcanization of the sheet in question to the opposed surfaces of the casing and tread be thus accomplished without applying heat externally to either of the latter. Preferably I utilize for the resistance elements in question a series of short strands 5 of relatively fine wire, disposing the same transversely of the sheet of fresh rubber and connecting their respective ends to continuous conductors 6 and 7, consisting of heavier wires. I preferably use two series of such wires 5, one series being thus applied to each side of the sheet, as shown best in Fig. 2, one of the two heavier wires acting as a lead, and one acting as a return as shown in Fig. 3. I may also arrange the transverse wires 5 composing the respective series, in criss-cross relation to each other as shown in Fig. 4.

In the assembled condition of parts, shown in Fig. 1, the conductors 6 and 7 will be bent into circular form and lie adjacent to the edges of the rim on each side of the casing, one end of each projecting and being adapted to be connected in series with a suitable current supply, so that such current may be caused to pass through the transverse wires that lie in contact with the sheet of rubber, as will be readily understood.

The next step consists in wrapping or winding a tape 8 or the like around the rim, casing and tread, so that upon inflation of the inner tube the casing and tread will be pressed together under a proper degree of pressure. Thereupon current is passed through the conductors and transverse wires as previously described, with the result that the sheet of fresh rubber is quickly and uniformly vulcanized, thereby firmly uniting the casing and tread together. As soon as such vulcanization has been completed, the wrapping is removed and the transverse strands cut or trimmed off close to the side of the casing so as to present a finished appearance, and the operation is then complete.

It will be understood that a sectional mold of suitable form may be utilized to hold the tread against expansion when pressure is applied within the casing by inflating the inner tube instead of utilizing the wrapping described above. It will also be understood that the number and size of the wire strands which serve as the electric heating elements will be gaged to suit the requirements of the particular case, and that the current utilized will also be varied, depending upon the character of these strands and the expedition with which it is desired to carry out the process. By means of the foregoing improved method and apparatus, not only do I achieve the desired result of directly and uniformly vulcanizing the particular part of the composite structure which requires to be thus treated, without affecting the condition of the other parts, but the embedded wires utilized in this connection provide an additional highly desirable reinforcement for the structure. Particularly where they are criss-crossed in the fashion illustrated in Fig. 4, they constitute in effect a wire mesh reinforcement extending entirely around the renovated casing.

While I have described my improved method and apparatus as applied to a particular use, it will be understood that they are equally adaptable for a variety of uses where a similar result is sought, and may be employed with equally satisfactory results in the manufacture of articles *de novo*, as in repairing worn ones.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. As an article of manufacture, a vulcanizing element, consisting of a layer of un-vulcanized rubber and an electric heating element held in direct contact therewith.

2. As an article of manufacture, a vulcanizing element consisting of a layer of un-vulcanized rubber and an electric heating element in close contact with the respective faces of said layer.

3. As an article of manufacture, a vulcanizing element consisting of a layer of un-vulcanized rubber and an electric heating element associated therewith, said element comprising two main wires at the sides of said layer, and heating wires held in direct contact with said layer and connected to the main wires.

4. As an article of manufacture, a vulcanizing element consisting of a layer of un-vulcanized rubber and an electric heating element, said element comprising two main wires at the sides of said layer, and heating wires in contact with the respective faces of said layer and connected to the main wires.

5. As an article of manufacture, a vulcanizing element consisting of a layer of unvulcanized rubber and an electric heating element, said element comprising two main wires at the sides of said layer, and crossed heating wires connected to said main wires, said crossed wires being in contact with said layer of rubber.

6. As an article of manufacture, a vulcanizing element consisting of a layer of unvulcanized rubber and an electric heating element, said element comprising two main wires at the sides of said layer, and crossed heating wires connected to said main wires, said crossed wires being embedded in said layer of rubber.

Signed by me this 19th day of December, 1916.

WILBUR B. BURKE.